United States Patent
Sigler et al.

(10) Patent No.: US 6,819,483 B1
(45) Date of Patent: Nov. 16, 2004

(54) OPTICAL DEVICE AND METHOD FOR CORRECTING FIELD-DEPENDENT PHASE ERRORS IN DISTRIBUTED APERTURE TELESCOPE SYSTEMS

(75) Inventors: Robert Dayton Sigler, Cupertino, CA (US); Alice Louise Palmer, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/942,680

(22) Filed: Aug. 31, 2001

Related U.S. Application Data (60) Provisional application No. 60/248,037, filed on Nov. 14, 2000.

(51) Int. Cl.[7] .............................................. G02B 23/00
(52) U.S. Cl. ...................................... 359/364; 359/399
(58) Field of Search ................................ 359/364–366, 359/727–729, 399; 250/201.9

(56) References Cited

U.S. PATENT DOCUMENTS

| | | | | |
|---|---|---|---|---|
| 4,101,195 A | * | 7/1978 | Frosch ........................ | 359/366 |
| 5,550,672 A | * | 8/1996 | Cook .......................... | 359/365 |
| 5,661,610 A | * | 8/1997 | Pasternak .................... | 359/859 |
| 5,905,591 A | | 5/1999 | Duncan et al. .............. | 359/399 |
| 5,940,222 A | * | 8/1999 | Sinclair et al. ............. | 359/689 |
| 6,426,834 B1 | * | 7/2002 | Braunecker et al. ........ | 359/366 |

OTHER PUBLICATIONS

LAMA Project Overview [online], Hickson, Paul, www.astro.ubc.ca/lmt/lama/documents, [Nov. 11, 1999].*

* cited by examiner

Primary Examiner—Mark A. Robinson
Assistant Examiner—Lee Fineman
(74) Attorney, Agent, or Firm—McDermott Will & Emery LLP

(57) ABSTRACT

Sine magnification error in a multi-aperture telescope or other optical system is corrected by placing an optical element in the optical path near an intermediate image of the telescope. The optical element has substantially no power, and in a reflective embodiment, has a plano-surface and a corrective surface. The corrective surface is defined by a rotationally symmetric polynomial of the general form $$z = \frac{cy^2}{1 + \sqrt{1 - (k+1)c^2 y^2}} + Dy^4 + Ey^6 + Fy^8 + Gy^{10}$$

where z is the departure from a plane, and y is the radial coordinate on the surface, D, E, F, G, C and K are parameters which are varied during the design process to minimize the sine magnification error, and represent aspheric coefficients, c is a vertex curvature and k is a conic constant.

29 Claims, 10 Drawing Sheets

OPTICAL DEVICE AND METHOD FOR CORRECTING FIELD-DEPENDENT PHASE ERRORS IN DISTRIBUTED APERTURE TELESCOPE SYSTEMS

The applicant claims priority under 35 U.S.C. §119(e)(1) and 37 C.F.R. §1.78 to the Provisional Application entitled "Optical Device And Method For Correcting Field-Dependent Phase Errors In Distributed Aperture Telescope Systems" filed Nov. 14, 2000, provisional application Ser. No. 60/248,037.

BACKGROUND OF THE INVENTION

The present invention relates generally to the field of optics, and more specifically, to a distributed aperture optical systems having means for correcting field-dependent phase errors. In particular, the invention relates to the use of a corrector plate is placed at or near the intermediate focus of a collector telescope to control distortion in a prescribed manner to eliminate the phasing error over the field of view.

DESCRIPTION OF THE RELATED ART

As modern telescope systems become larger and larger in aperture, it no longer becomes practical, based on cost and weight considerations, to build single aperture, monolithic, telescopes. One relatively recent improvement in the telescope art has allowed the construction of large aperture systems using a plurality of smaller telescopes that are optically linked together. Such optical systems are called distributed aperture telescopes. One such telescope is shown in U.S. Pat. No. 5,905,591 to Duncan et al.

As seen in the Duncan et al. patent, a distributed or "multi-aperture" imaging system includes a plurality of subaperture telescopes, each of which collects image data of an instantaneous field of view of an extended object scene within a field of regard of the imaging system. The image data collected by each is transferred by respective optical paths to a beam combiner which combines all the image data coherently to form a single high-resolution image of the object scene at a focal plane of the beam combiner.

In general, the optical system of the type described in the Duncan et al. patent includes three modules: (1) a group of afocal telescopes (called the "collector" telescopes), (2) a plurality of flat mirrors that direct the light from the collectors (called the "relay" group) to (3) a common combining telescope (called the "combiner" telescope). The collector telescopes, the relay group and the combiner telescope thus constitute a distributed aperture system.

In distributed aperture optical systems, it is desirable that the collector telescopes have as large a phased field of view possible. In other words, all portions of the image generated by the various apertures are registered and in phase with each other. A major limitation on this phased field of view is known as the "sine magnification error." This error is caused by collector telescope magnification variations over the field of view. If the magnification of the collectors follow the sine ratio, $$\frac{\sin(a_o)}{\sin(a_i)} = m,$$

where $a_i$ is the input angle and $a_o$ is the output angle of the collector telescope, and m is constant, the sine magnification error and thus the phase error over the field would be zero.

The field dependent phase error at a particular point in the field, with a baseline L, is given by $$p_k = L\sin(a_{ik})\frac{(m_k - m_o)}{m_o},$$

where $m_o$ represents a "paraxial" value for the sine ratio m and $m_k$ is the sine ratio computed for field point k. In the context of the present invention, the fractional sine magnification error at field point k is defined as $$s_k = \frac{(m_k - m_o)}{m_o},$$

The sine magnification error in a telescope is essentially a distortion term. Distortion in these telescopes is largely determined by the telescope form, i.e., a two mirror, three mirror, or four or five mirror design. The simplest collector telescope design that has a flat image plane, i.e., a zero Petzval sum, and a real exit pupil is a three-mirror anastigmat ("TMA"). These characteristics are essential to the successful operation of a distributed aperture telescope system, as noted in the aforementioned Duncan et al. patent. Unfortunately, a TMA has sine magnification errors. These errors can be mitigated to some extent by using a small instantaneous field of view and adjusting the position of the apertures in the exit pupil (known as "re-mapping the exit pupil"), when the field is steered over a larger field of regard ("FOR").

This internal steering of the field is described in the Duncan et al. patent. In this way, only a part of the sine magnification phase error is relevant, and re-mapping the exit pupil allows the majority of the phase error to be removed. IF the sine magnification error is sufficiently small, the instantaneous field of view is limited only by vignetting of the light by the optical elements. Furthermore, with small sine magnification errors, minimal pupil re-mapping as a function of FOR would be required. Only one steering mirror would be required to accomplish FOR steering when that mirror is located at the exit pupil of the collector telescope.

Thus, is would be beneficial to keep the TMA collector design as simple as possible, while at the same time correcting its sine magnification error.

SUMMARY OF THE INVENTION

The present invention involves the use of an optical element placed near the intermediate image of a TMA or other optical system. This element corrects phase error, but has little or no optical power, and little or no effect on image quality. In a surprising manner, the optical device corrects the sine magnification error without the use of complicated lens or other optical systems, and does so without a negative impact on the quality of the image.

The optical element can be reflective or refractive. In a refractive embodiment, the optical element has a flat surface and an opposite, corrective surface which is defined by a rotationally symmetric polynomial. The polynomial is of the general form $$z = \frac{cy^2}{1 + \sqrt{1 - (k+1)c^2y^2}} + Dy^4 + Ey^6 + Fy^8 + Gy^{10}$$

where z is the departure from a plane, and y is the radial coordinate on the surface. D, E, F, G, C and K are parameters which are varied during the design process to minimize the sine magnification error. These parameters represent aspheric coefficients, while c is a vertex curvature and k is a conic constant.

One aspect of the present invention is the process of designing and positioning the phase error corrector. First, a plurality of chief rays are traced from different field points. For each of these rays, the fractional sine magnification error $sk=(m_k-m_o)/m_o$ is computed. The surface shape parameters of the phase error corrector and its position are then varied to globally minimize the square of these fractional sine errors. For the example described herein, the corrector surface is rotationally symmetric, and has the form of the aforementioned polynomial. The D, E, F, G, c, and k parameters are varied during the design process to minimize the sine magnification error. If the maximum allowable phase error for a distributed aperture system with baseline L is p, then the fractional sine magnification errors of the collector must satisfy the equation $$s_k \le \frac{p}{L\sin(a_{ik})}$$

for every point in the field of view.

The many advantages of the invention will become more apparent from the following detailed description when taken in conjunction with the illustrative embodiments in the accompanying drawings.

DETAILED DESCRIPTION OF THE PREFERRED EMBODIMENTS

Figure 1:
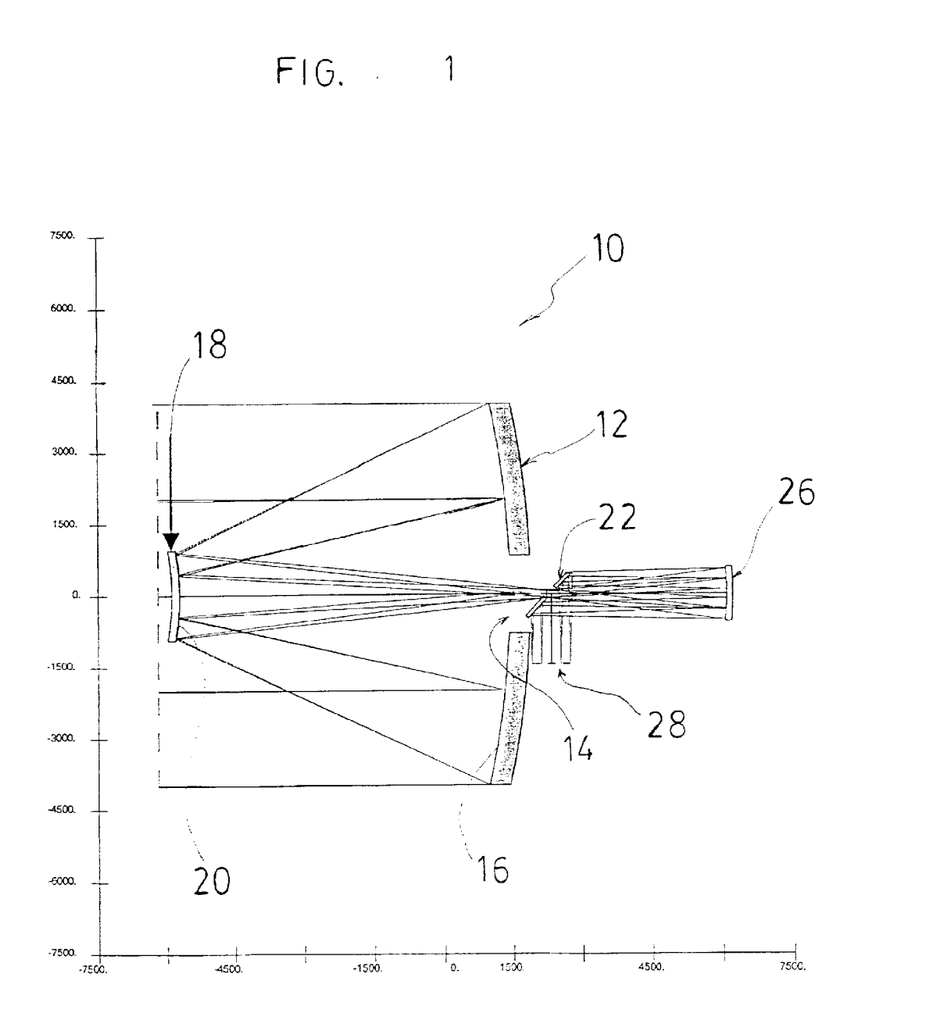
FIG. 1 is a schematic, cross-sectional view of a three mirror anastigmat optical system according to the present invention with a phase error corrector located near the intermediate image, and with the phase error corrector located in the perforation of the fold flat.
Figure 2:
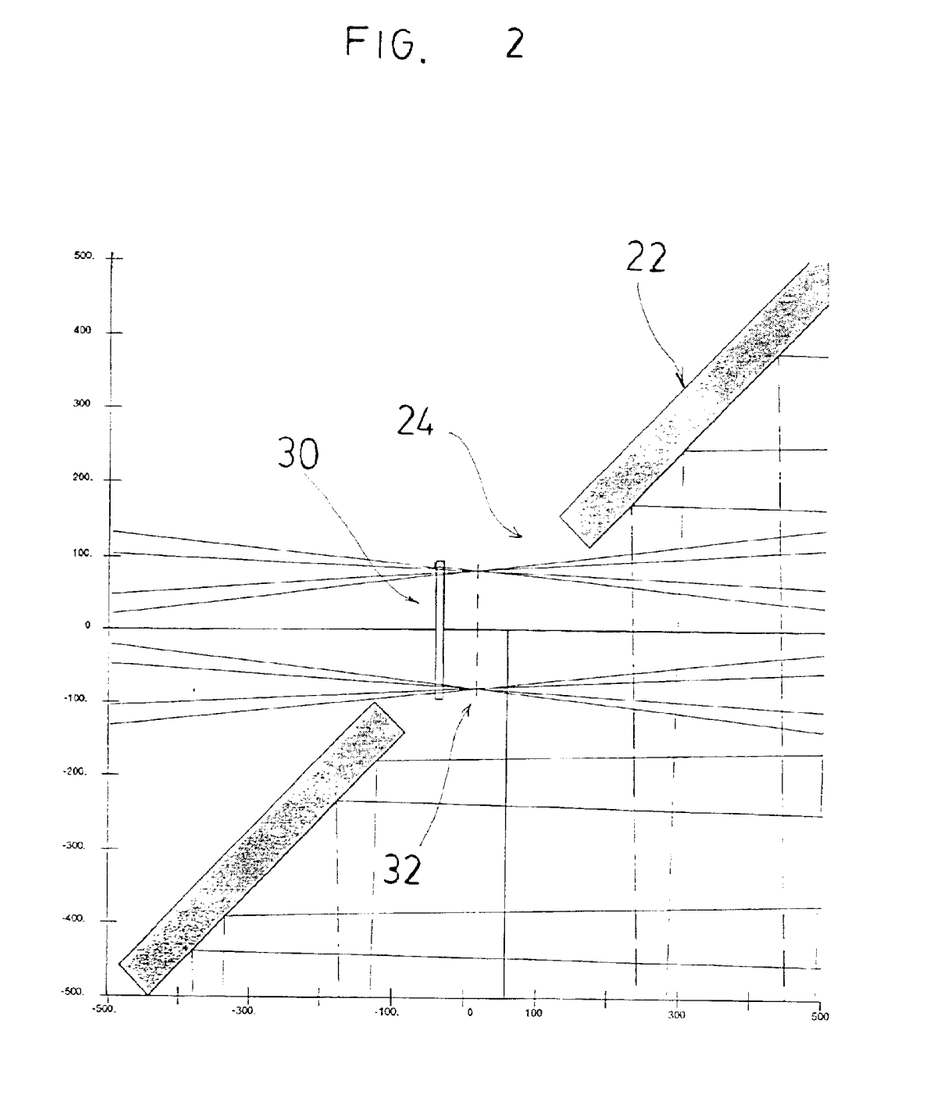
FIG. 2 is an enlarged cross-sectional view of the optical system of FIG. 1, showing the phase error corrector positioned relative to the intermediate image and within the perforation of the fold flat.

Referring to FIGS. 1 and 2, an optical system 10 is shown as a three mirror anastigmat (TMA). In the illustrated embodiment, test results were modeled and provided herein to show the effect of the present invention on sine magnification error. The modeled TMA 10 has an eight (8) meter aperture, and a sine ratio $m_o$ of 9.67.

The TMA 10 includes a primary mirror 12 having a perforation 14, through which light rays pass, and a reflective surface 16. A secondary mirror 18 is positioned in an optical path with the primary mirror 12, and is held in position by any suitable means (not shown). As an example, the Duncan et al. reference describes the use of support arms that are used to hold the secondary mirror of each collector telescope in position. These and other suitable support means may be employed. The secondary mirror has a reflective surface 20 that takes light rays collected by the primary mirror 12 and reflects them through the perforation 14 in the primary reflector 12.

A fold flat mirror 22 having a perforation 24 is positioned in proximity to the perforation 14 in the primary mirror 12. Light passing through a perforation 24 is directed to a tertiary mirror 26, which in turn directs light back to the fold flat mirror 22. The fold flat mirror 22 then directs the light to a exit pupil 28.

Barely visible in FIG. 1, and shown in detail in FIG. 2, is a phase error corrector 30, which is an optical element designed and positioned to reduce or eliminate the sine magnification error of the optical system. The phase error corrector 30 can be added to many existing TMA systems with minimal retrofitting modifications. It is simple in construction; in one embodiment the phase error corrector 30 is in the form of a refractive plate, optimized to correct the sine magnification error without changing any of the other mirrors. The only change in the illustrated example was the location of the tertiary mirror, wherein the tertiary mirror was moved to compensate for the path length change induced by the refractive plate.

As seen in FIG. 2, the phase error corrector 30 is located near the intermediate image 32 of the TMA 10. The phase error corrector 30 is located in the perforation 24 of the fold flat mirror 22 for the illustrated embodiment.

Figure 3:
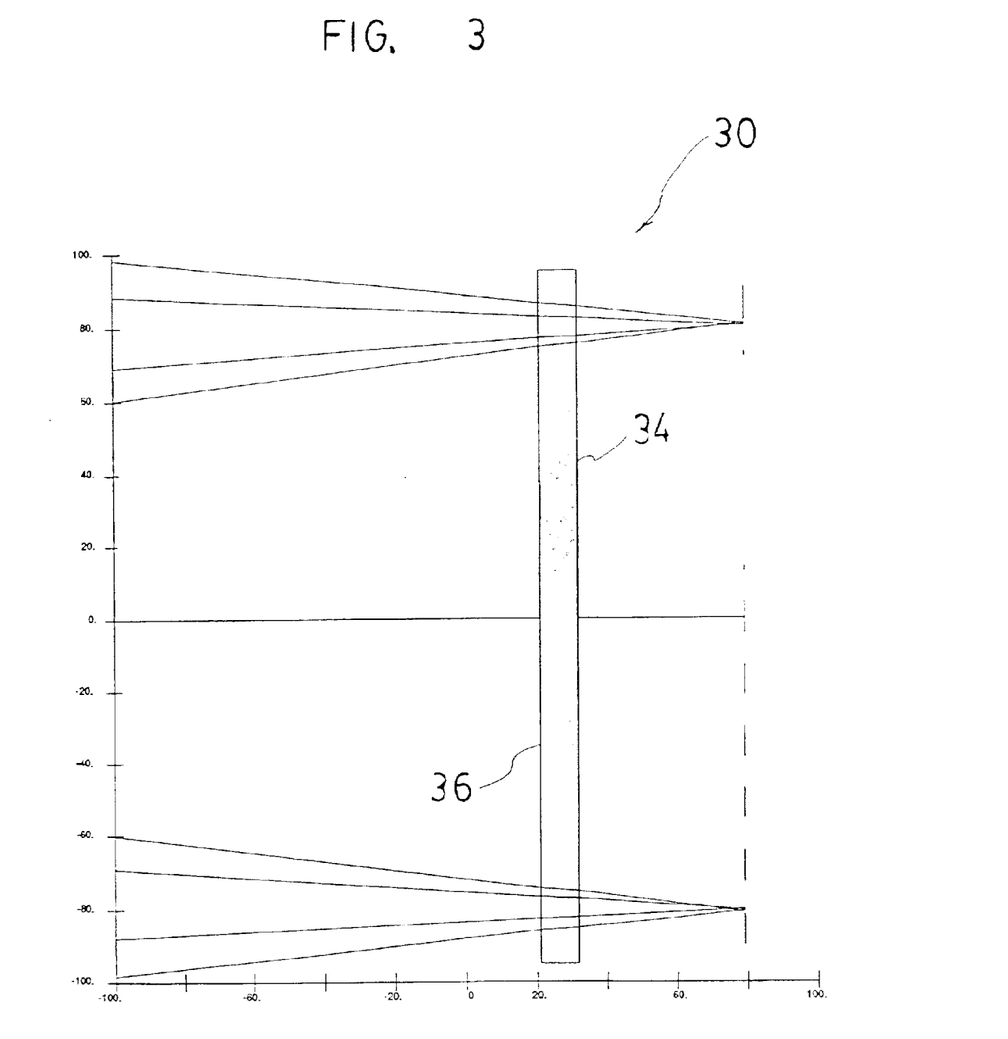
FIG. 3 is a further enlargement showing in detail the phase error corrector according to the present invention positioned relative to the intermediate image of the optical system.

As seen in FIG. 3, the phase error corrector 30 is illustrated as a refractive optical element in the optical path of light directed by the secondary mirror 18. The phase error corrector 30 has a flat surface 34 and an opposite, corrector surface 36 which in the illustrated embodiment has a shape described by a rotationally symmetric polynomial. The phase error corrector 30 has essentially no optical power, meaning that it is very nearly a plano-plano window. The intermediate image 32 is shown just downstream of the phase error corrector 30.

Figure 4:
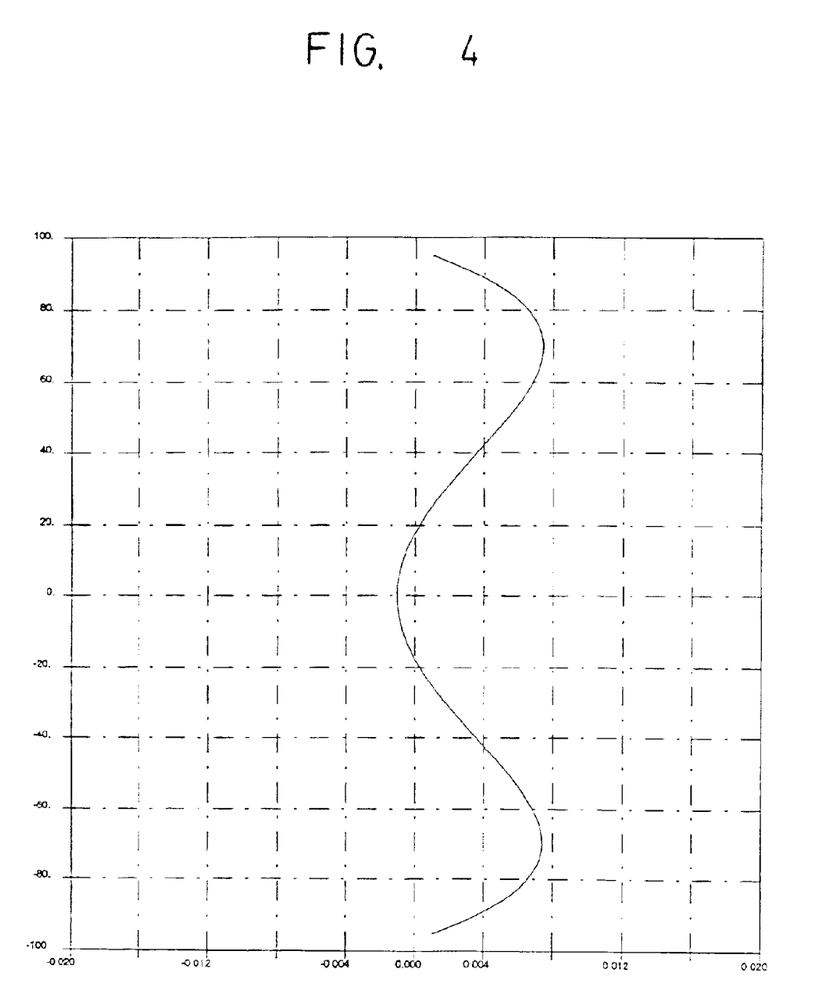
FIG. 4 is a is a plot showing the corrector surface of a phase error corrector according to one example of the present invention.

As seen in FIG. 4, which is a plot showing the profile of the corrector surface of a phase error corrector, designed so that the surface corrects the sine magnification error. In this embodiment, the surface shape is described by a rotationally symmetric aspheric polynomial of the form $$z = \frac{cy^2}{1+\sqrt{1-(k+1)c^2y^2}} + Dy^4 + Ey^6 + Fy^8 + Gy^{10}$$

where z is the departure from a plane, and y is the radial coordinate on the surface. D, E, F, G, C and K are parameters which are varied during the design process to minimize the sine magnification error. These parameters represent aspheric coefficients, while c is a vertex curvature and k is a conic constant.

Although the plot of FIG. 4 is not to scale, it illustrates the shape of the corrector surface. The radial coordinate y is represented on the vertical scale, and the horizontal scale (z) is expanded to show the shape of the corrector surface. The units are millimeters, so that the total departure from a plane is only a few microns for the illustrated example.

Figure 5:
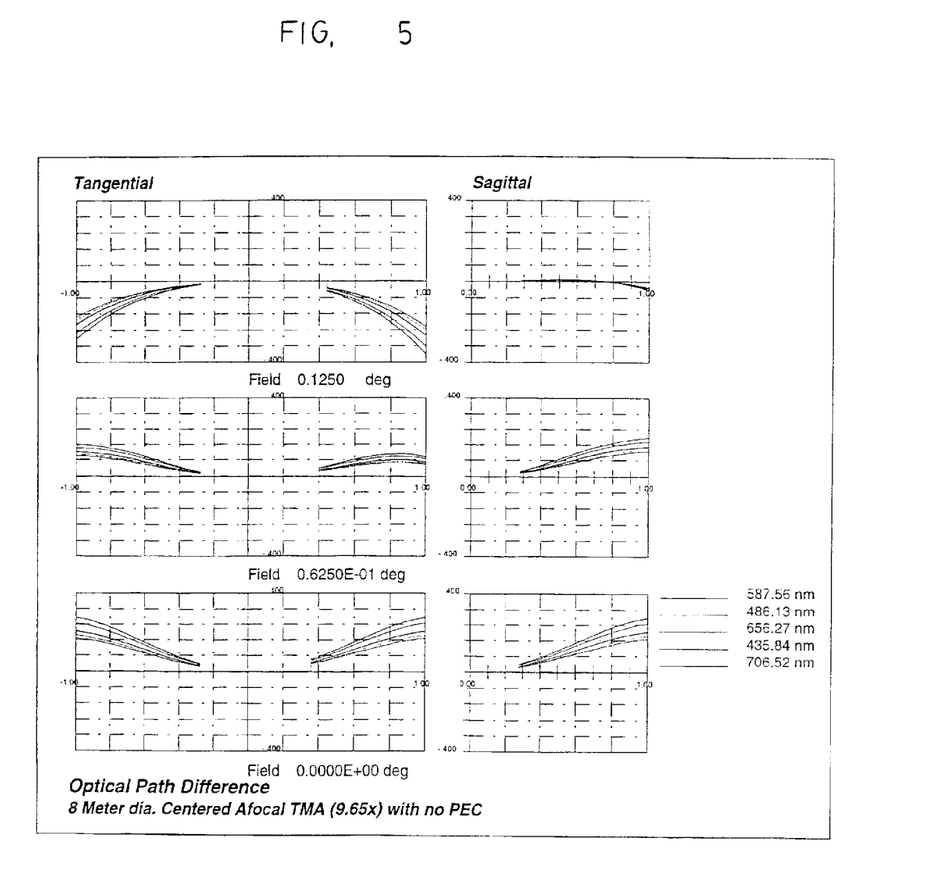
FIG. 5 is a series of optical path difference plots showing performance of an eight meter diameter TMA without using the phase error corrector at three field points, with plots giving performance at five visible wavelengths.
Figure 6:
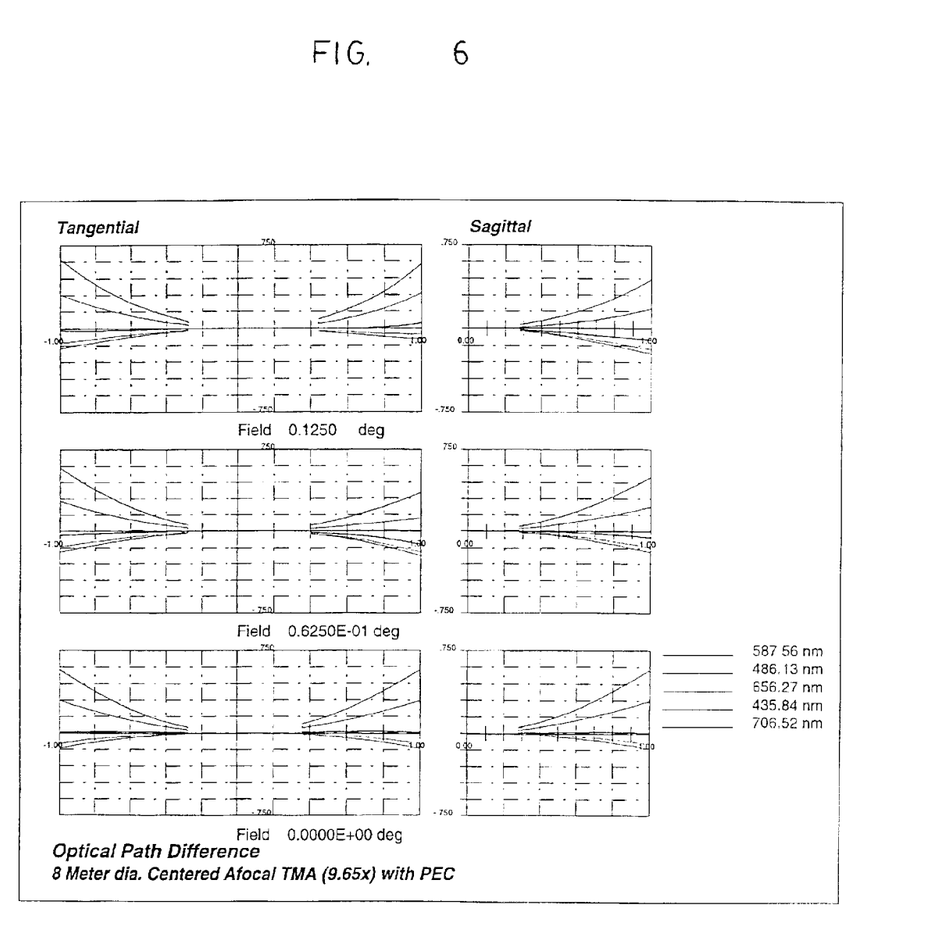
FIG. 6 is the same series of optical path difference plots as shown in FIG. 5, showing performance of an eight meter diameter TMA, but with the use of the phase error corrector at three field points, with plots giving performance at five visible wavelengths.
Figure 7:
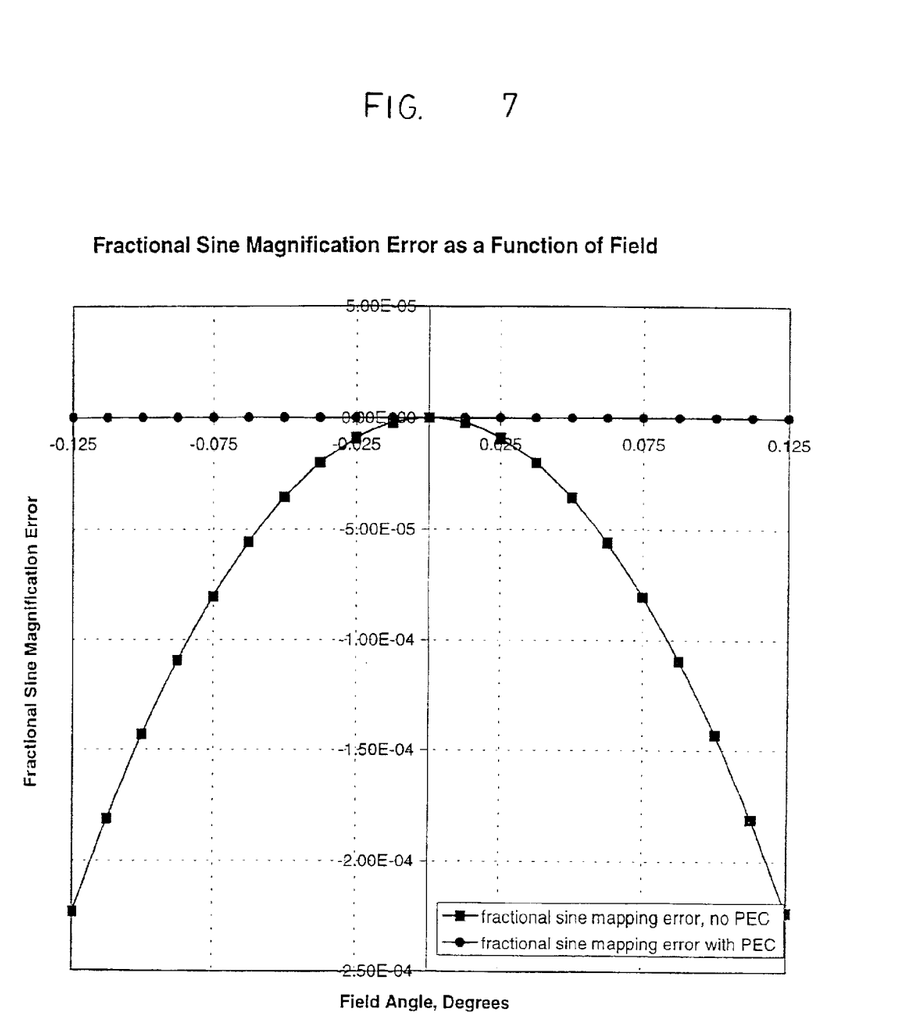
FIG. 7 shows a plot of the fractional sine magnification error as a function of field.

FIG. 5 is a series of optical path difference plots showing performance of an eight meter diameter TMA without using the phase error corrector at three field points, with plots giving performance at five visible wavelengths. In contrast, FIG. 6 is a measure of performance for the same TMA except the phase error was added to correct the sine magnification error. Adding the phase error corrector slightly degraded the nominal optical performance of the telescope. Because this example uses a refractive phase error corrector, there is some minor wavefront variation with wavelength, i.e., chromatic aberration. FIG. 7 shows a plot of the fractional sine magnification error as a function of field. It demonstrates how the phase error detector dramatically reduces the sine magnification errors.

Figure 8:
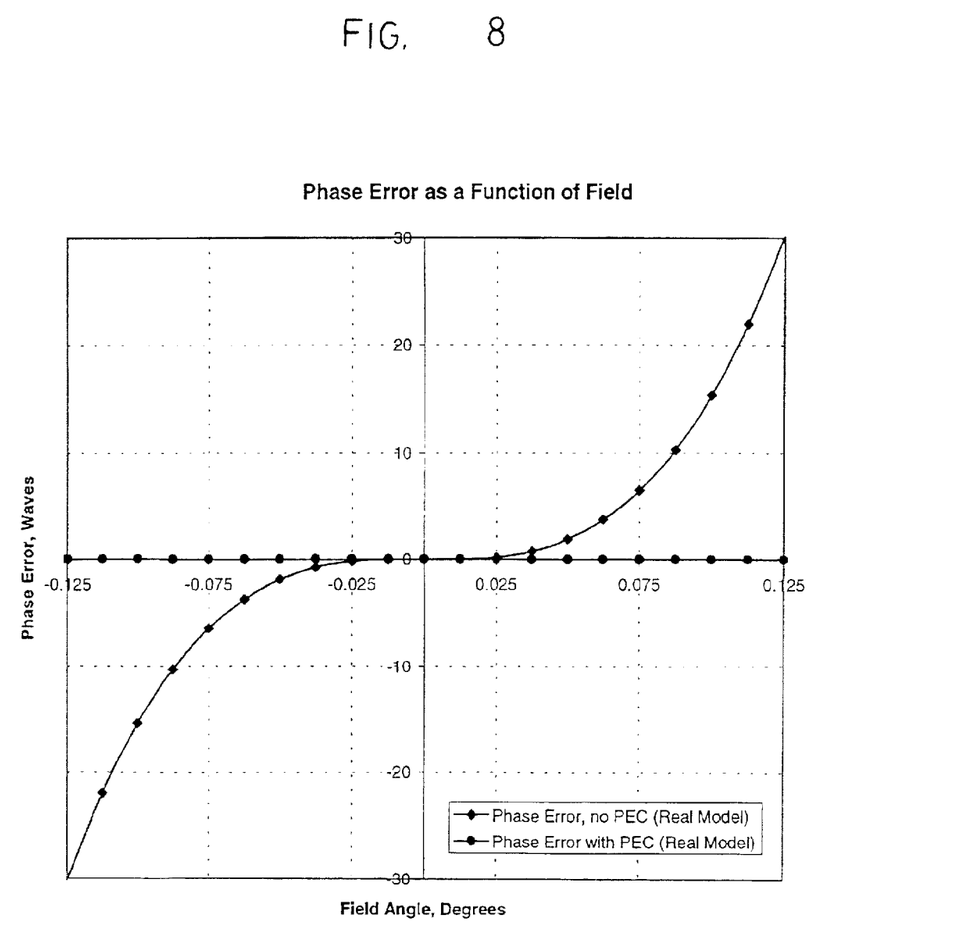
FIG. 8 is a plot showing phase error as a function of field, showing results with and without use of a phase error corrector according to the present invention.

FIG. 8 illustrates modeled results for the eight meter TMA described by way of example, which are used as the collector telescopes for a distributed aperture system having a number of collector telescopes arranged within a limiting circular diameter. The total number of collectors within this aperture and their spatial distribution is not critical to the evaluation of the sine error influence on the array performance. This can be determined by considering only the sine errors of the collector over its field and the maximum extent (or baseline length) of the array. In the example used herein, the encircling diameter is 44.6 meters. This distributed aperture system was modeled with and without the phase error corrector, as noted above, and the phase error was computed, by ray-tracing the system, as a function of field. The results of these models are shown in FIG. 8.

The graphs shown in FIG. 8 demonstrate that the phase error corrector causes dramatic reduction in the phase error over the field in this example (from 30 waves to less than 0.1 wave peak-valley at 650 nm wavelength across a 0.25 degree circular field of view.

When phase error correctors of the present invention are incorporated into the collector telescopes of a distributed array optical system, the field-dependent phase error (due to sine magnification errors) are eliminated, or at least nearly so. Furthermore, the diffraction limited field of view of the array is then limited only by vignetting and the residual aberrations, i.e., spherical, coma, astigmatism, alignment, fabrication, etc.) of the components. This allows the usable field of view to be much larger, perhaps by as much as a factor of 10. If the distributed array uses internal field of regard steering, incorporation of the phase error correctors in the collectors substantially reduces the need to re-map the exit pupil of the array as a function of steering angle to maintain diffraction limited image quality.

While prior studies and publications have shown that the desired sine magnification behavior in a distributed aperture optical system can be achieved by using collector telescope designs that have four or more general aspheric, powered mirrors, these tend to be complex designs that have four or five powered, aspheric mirrors. These designs are usually less compact, have low afocal magnification ratios, which makes the relay and combiner optics much larger, and have larger central obscurations, and usually contain multiple, large general aspheric surfaces, which are difficult and expensive to fabricate.

For a TMA with simple conic mirrors, the phase error corrector of the present invention can eliminate the sine magnification error, so that the phased field of view of a distributed telescope array (using these TMA collectors) is limited only by vignetting or other residual design errors, such as spherical aberration, coma, astigmatism, etc. The phase error corrector is physically small because it is located near the intermediate image. The TMA can be aligned independently of the phase error corrector. The compactness and simplicity of the TMA is retained, with the added benefit of having the desired sine magnification error corrected.

Figure 10:
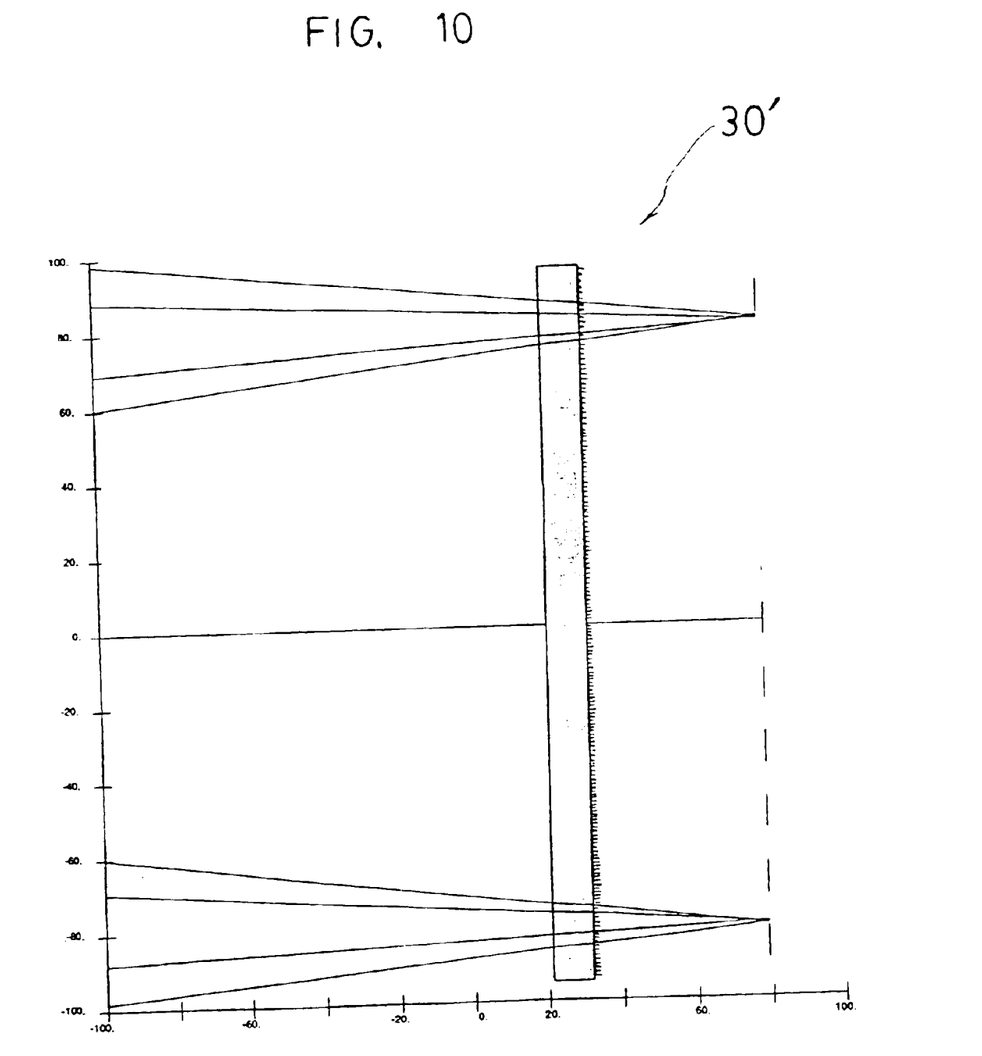
FIG. 10 is a simplified schematic of a phase error corrector configured as a diffractive element.

The example given herein is a refractive phase error corrector, but the concept can easily be extended to a reflective phase error corrector which would eliminate any potential chromatic aberration problems. Moreover, the present invention contemplates that the phase error corrector is a diffractive element 30' (see FIG. 10), such as a holographic device. Whether reflective, refractive or holographic the invention uses the corrector plate, with little or no power at or near the intermediate focus of the collector telescope to control distortion in a proscribed manner to eliminate the phasing error over the field of view in a distributed aperture telescope system.

Although the invention is described herein with respect to a distributed aperture telescope system, the phase error corrector can be adapted for use in other optical or imaging systems.

In the above-described embodiments, the optical element has been described as a single, aspheric element placed at or near the intermediate image of the multiple aperture optical system. It is within the scope of the present invention that the element could be placed at another image. Also, the preferred location is at or near an intermediate image. For an 8 meter TMA collector, the location would range from right on the image to about 50 millimeters away from the image, on either side of the image.

Figure 9:
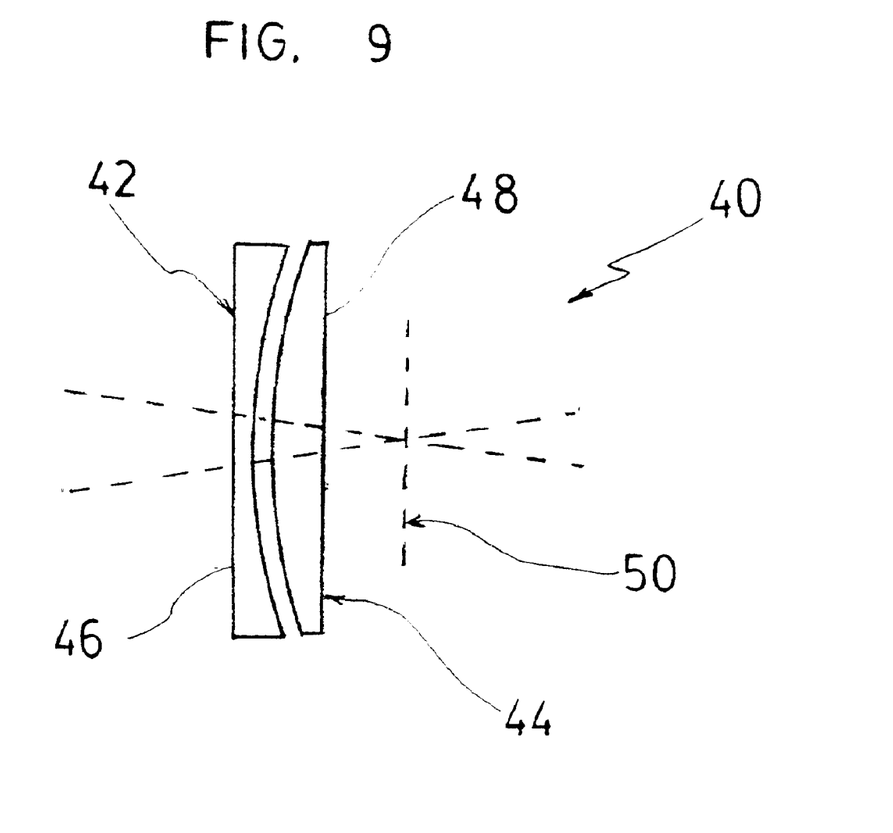
FIG. 9 is a schematic, vertical sectional view showing an optical element according to another aspect of the present invention.

Also, while the optical element may be a single, substantially non-powered element, FIG. 9 illustrates another embodiment in which the optical element 40 that includes a negative (power) lens 42 and a positive (power) lens 44. When assembled in a holding structure (not shown) the lenses will be in close juxtaposition with respect to each other (the illustration exaggerates both the spacing of the lenses and the degree of curvature for the purposes of clarity). Together, the lenses generate the required sine magnification correction with zero or near zero optical power with no aspheric surfaces.

As illustrated, one lens preferably has a planar or flat surface 46 or 48, respectively. This has the advantage of allowing the optical thicknesses to be easily adjusted such that all of the optical elements of the multiple aperture system can be matched. Also, the optical element 40 is positioned at or near the image 50, which is preferably the intermediate image. Exactly how "near" depends on the scale of the particular optical system, but as noted above, for an 8 meter collector, the distance could be somewhere in the range of 0 to 50 millimeters.

Although the invention has been described with reference to a particular embodiment, it will be understood to those skilled in the art that the invention is capable of a variety of alternative embodiments within the sprit of the appended claims.

What is claimed is:

1. A distributed-aperture telescope having a distributed aperture, the distributed-aperture telescope comprising:
   a plurality of three mirror anastigmats (TMAs) positioned within the distributed aperture, wherein each TMA includes:
      a primary mirror device, the primary mirror device being configured to receive electromagnetic radiation from one or more sources;

a secondary mirror device coupled to the primary mirror device, the secondary mirror device being configured to redirect a portion of the electromagnetic radiation reflected from the primary mirror device;

a tertiary mirror device coupled to the secondary mirror device, the tertiary mirror device being configured to redirect a portion of the electromagnetic radiation reflected from the secondary mirror device;

an intermediate image plane disposed between the secondary mirror device and the tertiary mirror device; and a phase plate disposed within a vicinity of the intermediate image plane, wherein the phase plate is configured to correct sine magnification error of the portion of the electromagnetic radiation over the field of view of the TMA.

2. The distributed-aperture telescope of claim 1, wherein each phase plate is a phase-error corrector.

3. The distributed-aperture telescope of claim 1, wherein the phase plates are configured to induce distortion to correct the sine magnification error.

4. The distributed-aperture telescope of claim 1, wherein each phase plate is a refractive element or a diffractive element.

5. The distributed-aperture telescope of claim 1, wherein each phase plate has substantially no optical power.

6. The distributed-aperture of claim 1, wherein the primary mirror device is disposed between the secondary mirror device and the tertiary mirror device.

7. The distributed-aperture telescope of claim 1, wherein:
each TMA further includes a fold flat mirror having a central aperture formed therein, and
the phase plates are disposed within the central apertures formed in the fold flat mirrors.

8. The distributed-aperture telescope of claim 1, wherein:
each primary mirror device has a central aperture formed therein; and
a portion of the electromagnetic radiation reflected from the secondary mirror devices passes through the central apertures formed in the primary mirror devices.

9. The distributed-aperture telescope of claim 1, wherein the intermediate image planes are disposed between the primary mirror devices and the tertiary mirror devices.

10. The distributed-aperture telescope of claim 1, wherein each phase plate includes a refractive element that has a flat surface and a corrector surface.

11. The distributed-aperture telescope of claim 10, wherein each corrector surface is defined by a rotationally symmetric polynomial.

12. The distributed-aperture telescope of claim 11, wherein the rotationally symmetric polynomial is of the general form $$z = \frac{cy^2}{1 + \sqrt{1 - (k+1)c^2 y^2}} + Dy^4 + Ey^6 + Fy^8 + Gy^{10}$$

where z is height, y is a radial coordinate, and D, E, F, G, c and k are parameters that are varied during a design process to effectively minimize the sine magnification errors, where D, E, F and G are aspheric coefficients, c is a vertex curvature, and k is a conic constant.

13. The distributed-aperture telescope of claim 1, wherein each phase plate is positioned within about 50 millimeters of a corresponding intermediate image plane.

14. The distributed-aperture telescope of claim 1, wherein the distributed aperture is about 44.6 meters.

15. A distributed aperture optical system comprising:

a plurality of collector telescopes, each having an image plane at which images are formed; and a plurality of phase plates corresponding to the plurality of collector telescopes, each phase plate is disposed approximately at or near the image plane of a corresponding collector telescope and has a surface adapted to correct sine magnification error in the images over the field of view of the collector telescope.

16. The distributed aperture optical system according to claim 15, wherein each phase plate is a phase error corrector configured to correct sine magnification errors.

17. The distributed aperture optical system according to claim 15, wherein the images are intermediate images.

18. The distributed aperture optical system according to claim 15, wherein the image planes are intermediate image planes.

19. The distributed aperture optical system according to claim 15, wherein each phase plate is positioned within about 50 millimeters of a corresponding intermediate image plane.

20. The distributed aperture optical system according to claim 15, wherein each phase plate is a refractive element or a diffractive element.

21. The distributed aperture optical system according to claim 15, wherein each phase plate has substantially no optical power.

22. The distributed aperture optical system according to claim 15, wherein each collector telescope further includes:

a primary reflector having a central aperture formed therein, a secondary reflector optically coupled to the primary reflector, a tertiary reflector having a central aperture formed therein and optically coupled to the secondary reflector, and a fold flat mirror having a central aperture formed therein and optically coupled to the tertiary reflector, wherein the fold flat mirror is disposed in an optical path near the central aperture formed in the primary reflector, and wherein the tertiary reflector is configured to reflect light passing through the central aperture formed in the fold flat mirror to the fold flat mirror, and wherein the phase plates are disposed within the central apertures formed in the fold flat mirrors.

23. The distributed aperture optical system according to claim 15, wherein each phase plate is a refractive element having a flat surface and a corrector surface configured to correct for sine magnification errors.

24. The distributed aperture optical system according to claim 23, wherein the corrector surface is defined by a rotationally symmetric polynomial.

25. The distributed aperture optical system according to claim 24, wherein the polynomial is of the general form $$z = \frac{cy^2}{1 + \sqrt{1 - (k+1)c^2 y^2}} + Dy^4 + Ey^6 + Fy^8 + Gy^{10}$$

where z is height, y is a radial coordinate, and D, E, F, G, c and k are parameters that are varied during a design process to effectively minimize the sine magnification errors, where D, E, F and G are aspheric coefficients, c is a vertex curvature, and k is a conic constant.

26. A method of adjusting a phase relationship in a distributed aperture optical system comprising:
   receiving electromagnetic radiation from one or more sources at a first mirror device;
   receiving a portion of the electromagnetic radiation reflected from the first mirror device at a second mirror device;
   transmitting a portion of the electromagnetic radiation reflected from the second mirror device through a phase plate that is configured to correct sine magnification error of the electromagnetic radiation over the field of view of the system; and
   receiving a portion of the electromagnetic radiation transmitted through the phase plate at a third mirror device.

27. The method of claim 26, further comprising receiving a portion of the electromagnetic radiation reflected from the tertiary mirror at a fold flat mirror having an aperture formed therein.

28. The method of claim 26, wherein the phase plate is a phase error corrector.

29. The method of claim 26, wherein the phase plate is approximately non-optically powered.

* * * * *